J. W. WEYMOUTH.
Root-Cutting Machine.
No. 220,894. Patented Oct. 21, 1879.
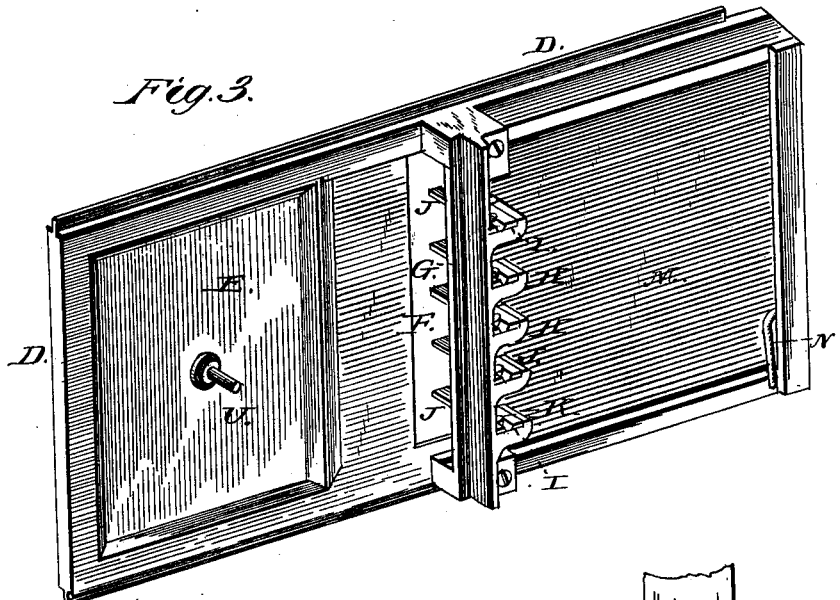
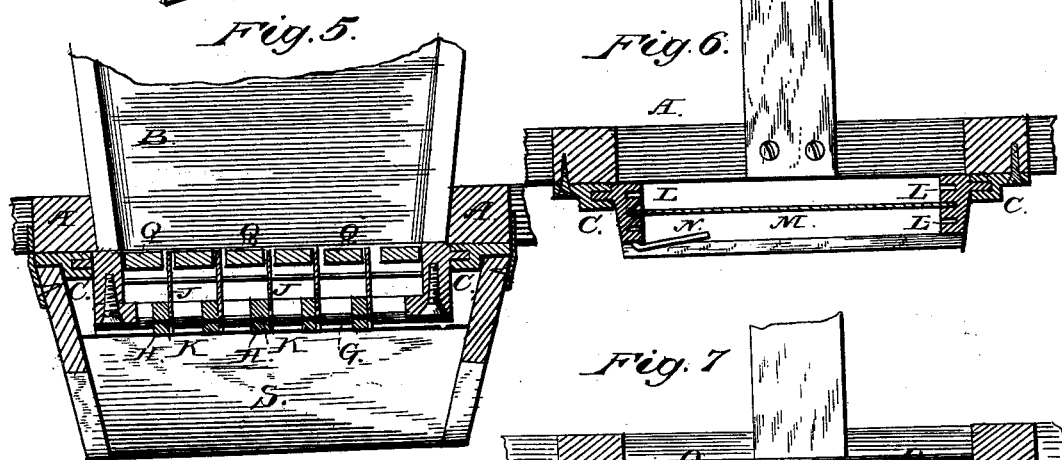
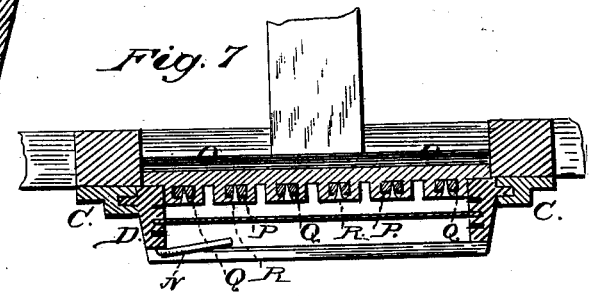
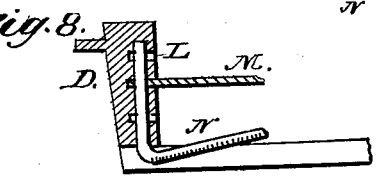
Witnesses:
Fred G. Dieterich
J. Walter Fowler
Inventor,
John Walter Weymouth
By C. A. Snow & Co.
Atty's.

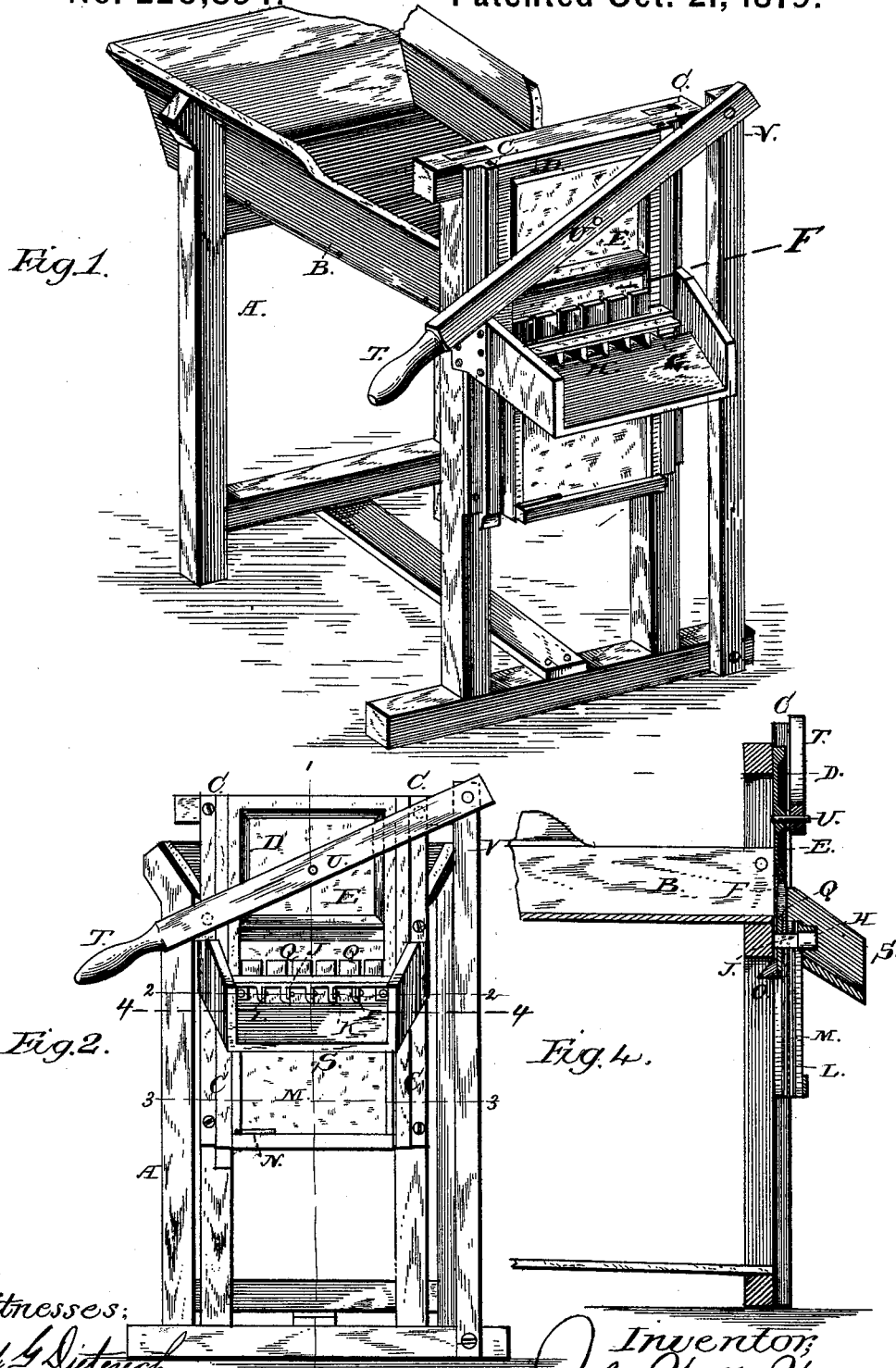

UNITED STATES PATENT OFFICE.

JOHN W. WEYMOUTH, OF GREENE, MAINE.

IMPROVEMENT IN ROOT-CUTTING MACHINES.

Specification forming part of Letters Patent No. 220,894, dated October 21, 1879; application filed May 16, 1879.

*To all whom it may concern:*

Be it known that I, JOHN WALTER WEYMOUTH, of Greene, in the county of Androscoggin and State of Maine, have invented certain new and useful Improvements in Machines for Cutting Roots; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a front view. Fig. 3 is a perspective view of the cutting-slide detached. Fig. 4 is a section on the line 1 1, Fig. 2. Fig. 5 is a section on the line 2 2, Fig. 2. Fig. 6 is a section on the line 3 3, Fig. 2. Fig. 7 is a section on the line 4 4, Fig. 2, and Fig. 8 is a detail view, showing the method of securing the gage-plate.

Corresponding parts in the several figures are denoted by like letters of reference.

This invention relates to that class of machines which are used for cutting or slicing roots for cattle-feed; and it consists in certain improvements in the construction of the same, which will be hereinafter fully described, and particularly pointed out in the claim.

In the drawings, A represents the frame, upon which the trough or hopper B is supported. Upon the front of the frame are secured guides C C, in the grooves of which the cutter-frame D slides vertically. Said frame is provided at its upper end with a permanent plate, E, below which the slicing-knife F is secured by screws, or in any other manner that will permit it to be readily detached, when necessary, for the purpose of sharpening it.

Secured to frame D, in front of and below the slicing-knife, is a cross-bar, G, provided with a series of downwardly-projecting fingers, H H. The sides of said fingers are provided with recesses or grooves I, adapted to receive the ends of the slitting-knives J, which said ends are slotted, so as to be capable of being secured by set-screws K in the manner shown. The free ends of the slitting-knives project inwardly to the front of the hopper.

The lower ends of the side pieces of frame D are provided upon the inside with vertical grooves L L, two or more in number, in which a plate, M, which I term the "gage-plate," is adjustable, as shown. A pin, N, serves to hold the gage-plate in position in any of the grooves.

A cross-piece, O, at the front end of the frame is provided with a series of sockets, P P, in which are secured a series of upright blocks, Q Q, the upper ends of which are level with the bottom of the hopper. These blocks are secured in the sockets by means of screws R, and are so arranged in relation to the knives that the slitting-knives will play between them and the slicing-knife behind them, or between the blocks and the front of the hopper. The object of these blocks is to furnish a firm support for the material to be cut, and to so locate the slices that they will readily fall into the spout S, located in front of the hopper, and which conducts them to the floor, or to any suitable receptacle placed in front of the machine.

To operate the cutter-frame I employ a lever, T, pivoted upon a pin, U, secured upon the front side of the permanent plate E of said frame, and having its fulcrum at the upper end of an upright, V, pivoted at the lower end of the frame of the machine.

It will be seen that by this arrangement a freedom of movement is gained, which will enable the cutter-frame to be operated without much frictional contact with the guides between which it slides.

From the foregoing description, and by reference to the drawings hereto annexed, the operation of my invention will be readily understood.

The roots or other material to be sliced are placed in the hopper, and fed toward the cutters. When the frame is raised the roots may be pressed against the gage-plate, which latter, as above set forth, is adjustable so as to regulate the thickness of the slices. When the cutter-frame is lowered the knives J will slit the roots, the slits being cut off by the slicing-knife following the slitting-knives.

It will thus be seen that narrow strips are produced, which can be easily masticated, without danger of choking the cattle to which they are fed.

Having thus described my invention, I claim and desire to secure by Letters Patent of the United States—

The frame A, having cross-piece O, provided with sockets P P and blocks Q Q and guides C C, in combination with the cutter-frame, sliding in said guides, and provided with the permanent plate E, detachable knife F, cross-bar G, having fingers H, and knives J, secured adjustably and detachably to said fingers at right angles to knife F, and the adjustable gage-plate M, all arranged and operating substantially as and for the purpose set forth.

In testimony that I claim the foregoing as my own I have hereto affixed my signature in presence of two witnesses.

JOHN WALTER WEYMOUTH.

Witnesses:
ISAAC C. MERRILL,
CHARLES H. NICHOLS.